Jan. 10, 1933.                    H. E. TAUTZ                    1,894,010
                         WORK HOLDING MEANS FOR GAUGES
                    Filed July 27, 1932         4 Sheets-Sheet 4

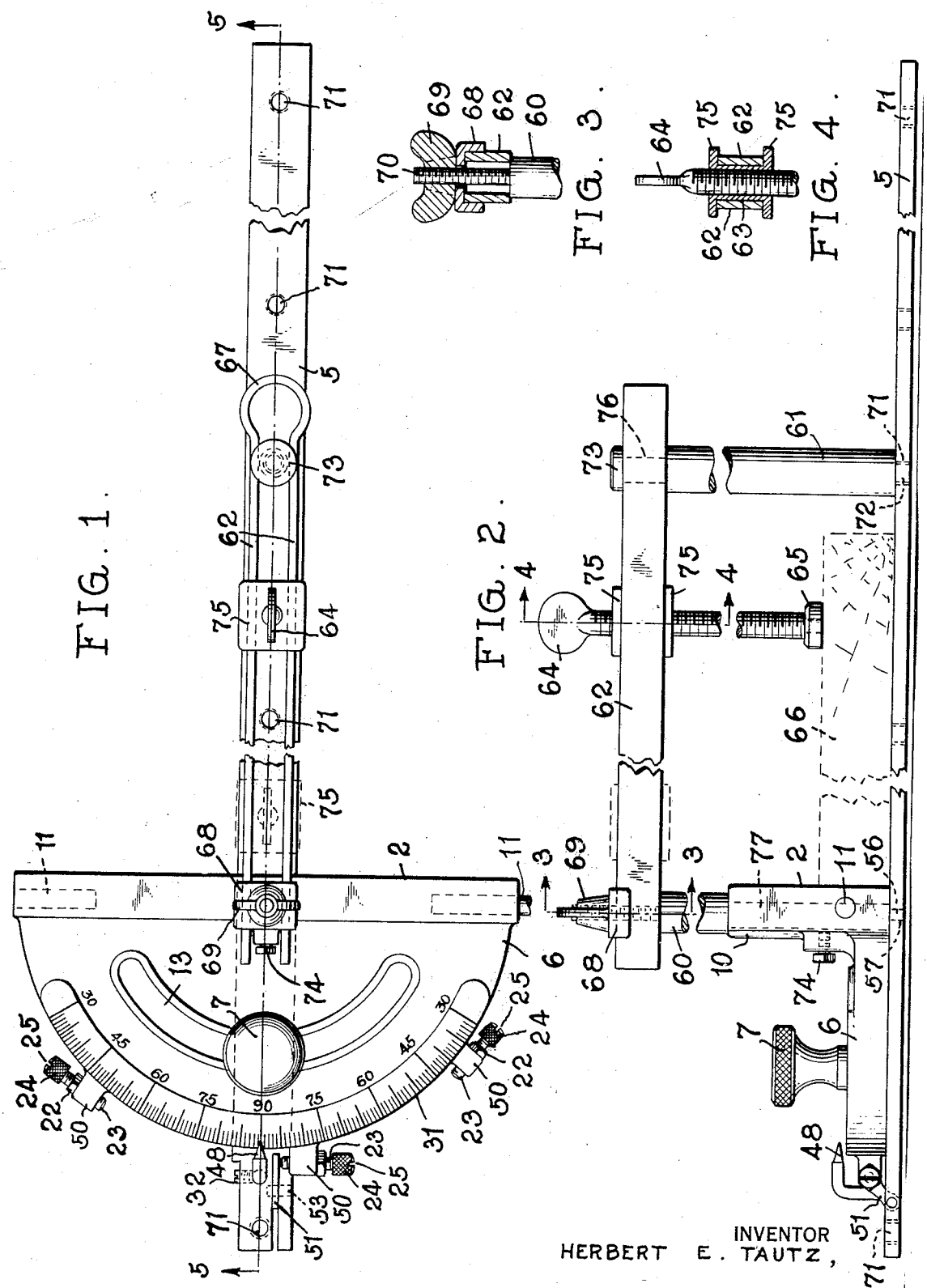

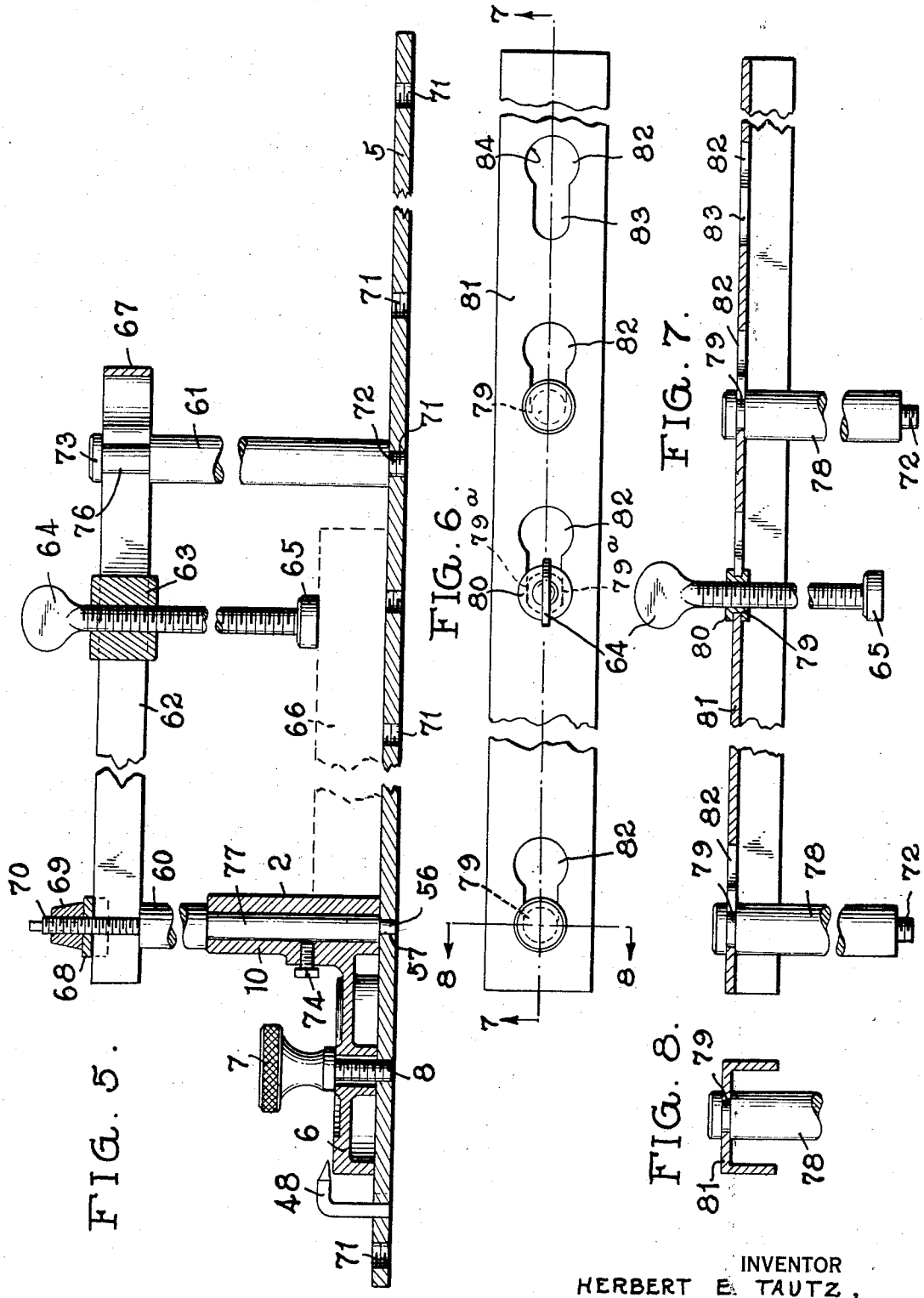

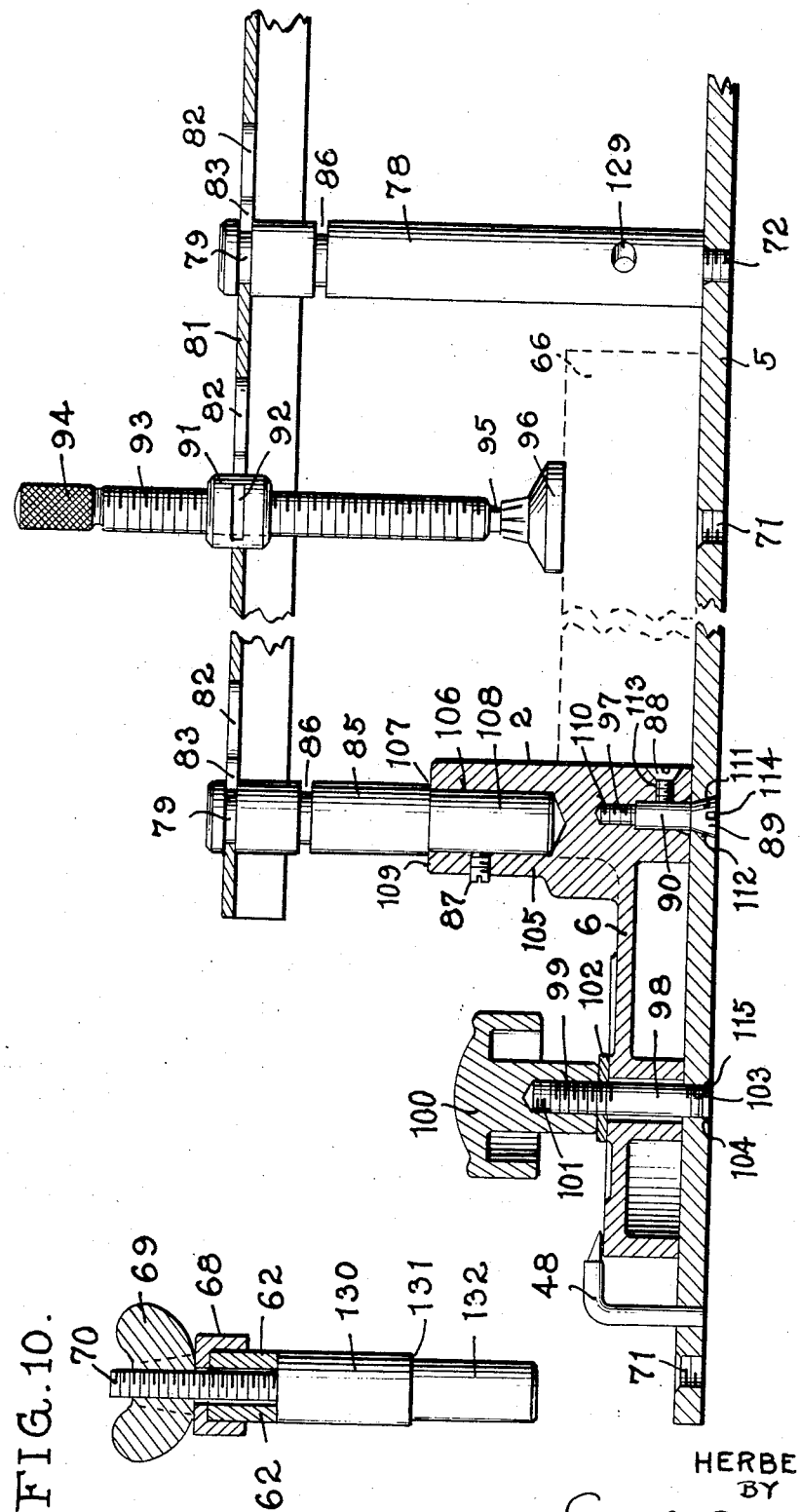

HERBERT E. TAUTZ,
INVENTOR

BY Carl A. Hellmann,
ATTORNEY

Patented Jan. 10, 1933

1,894,010

UNITED STATES PATENT OFFICE

HERBERT E. TAUTZ, OF MILWAUKEE, WISCONSIN, ASSIGNOR TO DELTA MANUFACTURING COMPANY, OF MILWAUKEE, WISCONSIN

WORK-HOLDING MEANS FOR GAUGES

Application filed July 27, 1932. Serial No. 625,186.

My invention relates to a work-holding means adapted to cooperate with a gauge or the like for use with a machine tool.

More specifically, my invention relates to improvements in means for clamping a workpiece or a number of workpieces to a so-called miter gauge which is adapted to cooperate with a circular saw or other machine for operating on wood, metal or other material.

An object of the invention is to provide an attachment which may be used in connection with a gauge to hold the workpiece or workpieces firmly and immovably in contact with the gauge so that said workpiece or workpieces may be fed to the tool of the machine at a desired angle.

A further object is to provide a simple and inexpensive attachment which may be readily and simply attached to any gauge of this kind, both such gauges which are still in the course of manufacture and the gauges which are already in use.

A further object is to provide a work-holding attachment for a gauge, which is adjustable to hold securely workpieces of different dimensions, both in height and breadth.

A further object is to provide a clamping device of this nature wherein the points of attachment of the clamping device to the gauge may be shifted so as to provide a rapid and firm clamping in any case regardless of the dimensions of the workpiece.

Other objects and advantages of the invention will in part be mentioned hereinafter and in part will be self-evident from the following specification and claims, in connection with the accompanying drawings wherein:

Fig. 1 is a plan view showing a miter gauge of a type which embodies a substantially semi-circular body member connected to a rectangular bar, with the workholding means attached thereto, partly broken away, as indicated.

Fig. 2 is a side elevation corresponding to Fig. 1, also partly broken away.

Fig. 3 is a partly sectional detail of a portion of Fig. 2, on the plane indicated by the line 3—3, looking in the direction of the arrows.

Fig. 4 is likewise a partly sectional elevation of a detail of Fig. 2, on the plane indicated by the line 4—4, looking in the direction of the arrows.

Fig. 5 is an elevation, partly in central longitudinal section, of the device shown in Fig. 1, on the plane indicated by the line 5—5, looking in the direction of the arrows.

Fig. 6 is a plan view of a modified form of clamping device, partly broken away, which may be used in place of the clamping device illustrated in Figs. 1 to 5 inclusive.

Fig. 7 is an elevation, partly in central longitudinal section, on the plane indicated by the line 7—7 of Fig. 6, and Fig. 8 is a view of the same in cross section, on the plane indicated by the line 8—8 of Fig. 6.

Fig. 9 is a central vertical longitudinal section, partly in elevation, of a further modified form of clamping device.

Fig. 10 is a detail view showing a rod which may be used in place of the front rod employed in the Fig. 9 form.

Figure 11:
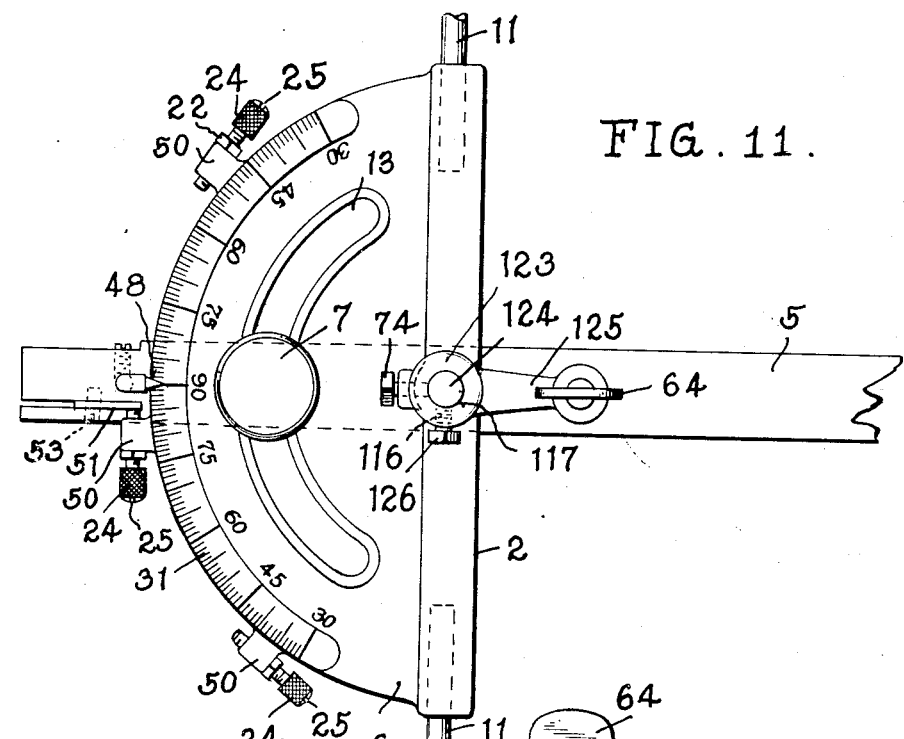
Figs. 11 and 12 are respectively a top plan view and an elevation of a still further modified form of clamping device.

Referring first to the form of the invention illustrated in Figs. 1 to 5 inclusive, the miter gauge comprises a body member 6, which may be of substantially semi-circular shape, having a work-guiding surface 2, which is a substantially plane surface arranged at right angles to the general direction of the body member, that is, when the gauge is in use upon a saw table or the like, the surface 2 will be perpendicular to the top of said table. The miter gauge comprises also a bar 5 which is substantially straight and preferably of rectangular cross section, which slides in a guiding groove in the table when in use. The body member 6 is connected to the bar 5 by means of a pivot 56 secured to the body member and mounted in a bore 57 of the bar 5 to pivot freely about the same. The body member 6 is provided with an arcuate slot 13 through which passes a screw 8, having a knurled head 7, and serving to clamp the body 6 to the bar 5 at any desired position of adjustment. The body 6 is also preferably provided with a graduated scale 31, usually graduated in units of angular measure, such as degrees, and, in the specific instance illustrated, having a 90° graduation point at the center and extending through 60° to each side of the said center. This scale is read by means of a pointer 48 which is secured to the bar 5, as by a set screw 32, so that at any time the pointer will indicate the angle which the surface 2 makes with the direction of the bar 5, and which is 90° in the position illustrated. In order to make it possible to set the gauge rapidly and accurately to certain much-used angles, I provide a stop member 51 mounted upon a pivot 53, here shown as a screw, said member 51 cooperating with the end of any one of the screws 23, three of which are here illustrated, which are threaded into lugs 50 secured in any desired way to the body member 6, each such screw having a manually operable knurled head 24 which may also be slotted as indicated at 25 to receive a screw driver and which may be secured in adjusted position by means of a suitable lock nut 22. By properly adjusting the positions of these screws to cooperate with the end of the stop member 51, it will be evident that the gauge may be set to a desired angle by merely causing the stop member 51 to engage the end of the corresponding screw 23. In order to put the stop member 51 out of service when it is not desired to make use thereof, said member 51 may be pivoted or swung about its retaining screw 53 to a position out of alinement with the screws 23, in which case the gauge may be set by means of the pointer 48 and the scale 31, if desired. Rods 11 may be provided in the body 6 to assist in locating the workpieces definitely with respect to the gauge and thus adjusting the lengths to which they will be cut or determining the points at which certain operations will be performed thereon by the machine. These features do not constitute a part of the invention claimed herein, but are given here merely to assist in understanding the type of device to which the present invention relates.

As applied to this type of gauge, one form which my invention may take comprises a bar or strap 62 bent into a hairpin-shape with an approximately circular end, as shown at 67 connecting the two parallel portions of the hairpin. The said parallel portions are employed to hold a clamping screw 64, here shown as a thumb screw having a swivel head or washer 65 pivoted to its lower end, to clamp the workpiece 66 against the bar 5.

The thumb screw 64 is threaded through a block 63 having flanged ends at 75 engaging the arms of the bar 62, as shown best in the sectional view, Fig. 4. In order to retain the U-shaped or hairpin-shaped bar 62 firmly in position, securing means are provided comprising a rear stud or rod 61 having a reduced portion 76 near its upper end and terminating in a portion 73 of greater diameter than the portion 76, so that the reduced portion 76 may fit firmly and snugly between the arms of the U-shaped member 62, and yet permit said arms to slide along said reduced portion. The head 73 will thus serve to prevent the member 62 from moving upwardly while the rod 61 itself will prevent downward movement thereof. This rod 61 may be removably secured to the bar 5 in any suitable way.

A preferred method, as illustrated in Figs. 2 and 5, is to provide a threaded extension 72 at the lower end of the rod 61, and to provide correspondingly threaded apertures 71 in the bar 5, as shown, so that the rod 61 may be secured to the bar 5 by screwing its end 72 into a selected one of the threaded apertures 71.

In order to secure the forward end of the bar 62 to the gauge, a rod 60 may be provided, preferably having a portion 77 of reduced diameter fitting within a corresponding bore in the lug or post 10, preferably integral with the body 6 of the gauge. The rod 60 preferably terminates in a further reduced portion 56 cooperating with a corresponding aperture 57 in the bar 5, to serve as a pivot about which the body of the gauge may turn with respect to the said bar 5. The rod 60 may be secured rigidly within the said lug 10, by means of a set screw 74 or any other suitable means. At its upper end the rod 60 may be provided with a reduced threaded portion 70. A wing nut 69 may be threaded upon said portion 70, and a U-shaped washer 68 may be arranged below said wing nut 69, and above the bar 62, so as to grip the two parallel prongs or tines of said bar firmly and secure them to the upper end of the full-diameter portion of the rod 60, as shown clearly in Figs. 2, 3 and 5.

It will be clear that, with the parts in the positions illustrated, it will be possible to clamp the workpiece 66 firmly to the bar 5 by means of the thumb screw 64, when the bar 62 is held by the rods 60 and 61 respectively as described. The substantially circular portion of the bar 62 at 67 is of sufficiently large internal diameter to pass freely over the end 73 of the rod 61, so that said bar may be readily removed by loosening the wing nut 69 and slipping the bar 62 forward until the circular portion 67 thereof is aligned with the said head or end 73 of the rod 61. It is also clear that the rod 61 may be secured at any selected position on the bar 5 corresponding to one of the threaded apertures 71 therein by merely unscrewing it from one such aperture and screwing it into another. It is desirable to locate the rear post reasonably close to the rear end of the workpiece 66, so as to avoid undesirable spring, and this is the reason that a plurality of tapped holes 71 is provided to accommodate said rod 61. After the rod 61 has been screwed into the selected hole, the bar 62 may be put in place thereon by slipping the circular portion thereof over the head 73 and thereupon sliding the bar 62 backward (to the right) to a sufficient extent to cause the two prongs of the bar to be held firmly beneath the head 73. When the bar 62 has been thus adjusted, the wing nut 69 may be tightened upon the screw 70 to secure the bar 62 firmly in position. Thereupon the block 63 may be slid forward or back between the two arms or tines of the bar 62 until the thumb screw 64 is brought to a desired position, and the workpiece may then be secured firmly by merely tightening said thumb screw 64, thus bringing the swivel washer 65 against the said workpiece 66. It will be noted that the tension produced in the rod 60 by the clamping action is transmitted to the bar 5 by way of the lug 10 and then through the body 6 to the screw 8 and thus to the bar 5, so that care should be taken to tighten the screw 8 firmly before tightening the thumb screw 64.

Referring now to Figs 6, 7 and 8, I have shown a modified form of clamping means wherein I substitute two similar rods 78 for the two dissimilar rods 60 and 61. These rods 78 are, in general, similar to the rod 61 of the Figs. 1 to 5 form, but differ therefrom in that they have merely a relatively narrow groove 79 near the top end of each, to receive the web of a channel bar 81. In other words the groove 79 in each rod 78 is of a thickness only slightly greater than the thickness of the web of said channel bar 81, so that said web may be freely inserted into, and removed from, the groove. The channel bar 81 is preferably provided with a series of slots 82, which may be of the so-called "key hole" shape, that is, consisting of a substantially circular portion 84, which is of large enough diameter to pass freely over the end of the rod 78, and connected with a portion 83 of reduced width and substantially parallel sides, as shown, the internal width of the slot at this portion being sufficiently great to pass over the bottom of the groove 79 in each rod 78, but too small to pass over the head portion or body portion of the rod 78.

These rods 78 are likewise provided at their lower ends with threaded portions 72 which will fit into threaded apertures 71 in a bar 5 similar to the bar 5 shown in Fig. 5. The difference between the structure embodied in Figs. 6, 7 and 8 and that of the Figs. 1 to 5 form, is that the forward rod 78 is exactly like the rear rod 78, and the forward rod 78 does not enter into the lug 10, but into a threaded aperture 71 in the bar 5 which is located to the left of the body member, such as the threaded aperture 71 shown at the extreme left of Fig. 5. It will be noted that this form of clamp is somewhat simpler than the first type, and dispenses with the more or less complicated structure of the rod 60 employed in the first type. It will be obvious that the spacing between the keyhole-shaped slots 82 of the channel bar 81 must be the same or substantially the same as the spacing of the threaded apertures 71 of the bar 5 in order that the two rods 78 may simultaneously be alined with correspondingly spaced slots 82. In this form the thumb screw 64 with its swivelled head 65 is threaded through a short collar 80, having a groove 79 therein exactly like the groove 79 in each post 78, so that the collar 80 may be inserted through the portion 84 of one of the key hole slots until the groove 79 of its collar 80 is in alinement with the web of the channel bar 81, whereupon said collar 80 may be slipped forwardly to engage the groove upon said web. Obviously either the swivel washer 65 or the head of the thumb screw must be of small enough size to pass freely through the keyhole slot, in order to permit the collar 80 to become engaged with the web, and preferably, of course, this will be accomplished by making the swivel washer or head 65 of slightly less diameter than the circle 84.

Passing now to the modified form shown in Fig. 9, the body member 6, having a lug 105, corresponding to the lug 10 of the Fig. 5 form, has, in the said lug, a bore 106 adapted to receive the end 108 of a rod 85, which preferably may be provided with a guiding shoulder 107, cooperating with the upper surface 109 of the lug 105 to properly position the rod 85 as to height with respect to the said body member 6. This rod 85 may be secured to the body member in any desired way, for instance, by means of a set screw 87 threaded into a tapped hole in the lug 105 and bearing against the portion 108 of the said rod 85. A rod 78, as in the form shown in Figs. 6 to 8, may be secured to the bar 5 by means of a screw-threaded portion 72 at its lower end, engaging in one of the threaded apertures 71 of the bar 5, as in the previously described forms. This rod 78 preferably has a groove 79 near its upper end similar to the groove 79 shown in Figs. 7 and 8, and cooperating with the channel bar 81 and its keyhole slots 82 and 83 as in said Figs. 6, 7 and 8. If desired, a further groove 86, similar in size to the groove 79 may also be provided in the rod 78, but spaced some distance from the former groove 79, so that the channel bar 81 may be engaged with the rod 78 at either one of two different elevations when desired. A hole 129 may also be provided in the rod 78 to facilitate tightening or loosening the screw 72 in the hole 71, by passing a suitable rod or nail through the said hole 129 and using it as a wrench.

The rod 85, already described, may be provided with grooves 79 and 86, similar, respectively, in all respects to those of the rod 78 and spaced at the same distances from the upper end of said rod 85 as are the corresponding grooves of the rod 78. It will be understood, of course, that if preferred another rod 78 may be employed in the threaded opening 71 at the extreme forward end of the bar 5 of Fig. 9 instead of using the rod 85, but in such cases the device will not differ materially from the modification already shown and described in Figs. 6, 7 and 8, except that each of the rods 78 in that case will have the two grooves 79 and 86 instead of only the single groove 79 of Fig. 7.

The bar 5 in the Fig. 9 form may be secured to the body member by means of a screw 90 having a threaded end 97 screwed into a tapped hole 110 in the lug 105, and having a head 89 which is conically tapered, as shown at 111, to cooperate with a correspondingly tapered bore 112 in the bar 5. This screw 90 may be adjusted by means of its slot 114 to engage the bar 5 with the desired degree of tightness and friction and may then be secured in the lug 105 by suitably tightening the screw 88 which is threaded into a tapped hole 113 opening into the bore which receives the screw 90. In this way it is possible to take up any looseness or wear existing between the screw 90 and the aperture 112 of the bar 5, and this is a somewhat better construction than that illustrated in Fig. 5, because of this possibility of adjusting the tightness of the fit.

In this form I also show a slightly modified means for holding the body member 6 in its proper position of angular adjustment with respect to the bar 5. This means comprises a stud 98 which is threaded at one end 103, as shown, and tightly screwed into a correspondingly tapped opening 104 in the bar 5, and which, if preferred, may further be riveted slightly as shown at 115 to prevent it from loosening from the bar 5. The stud 98 is threaded at its other end 99, as shown, and engages in a correspondingly threaded hole 101 in the clamping nut 100. A washer 102 may be interposed between the clamping nut 100 and the top of the body member 6.

The workpiece 66 may be secured against the bar 5 by means of a screw 93, preferably knurled, as shown at 94, at one end, and having a swivel head 96 carried by its lower end 95. This screw 93 may be threaded through a collar 91 having a flat groove 92 at each side thereof, cooperating with the reduced parallel sided portion 83 of any one of the keyhole slots, the outer diameter of the collar 91 being such that it may pass readily through the circular portion 82 of any one of the keyhole slots.

Referring now to Fig. 10, it will be noted that I have illustrated a rod 130 which is similar in certain features to the rod 60 shown in Fig. 5 and which may replace the rod 85 of Fig. 9, if preferred. If this be done, the rod 78 of Fig. 9 also will be replaced by a rod 61, such as shown in Fig. 5, and the hairpin-shaped bar 62 will then be employed in place of the channel bar 81 of Fig. 9, the sliding block 63, thumb screw 64 and clamping head 65 being identical with the corresponding parts as already shown in Fig. 5. It will be noticed that the only difference is that instead of using a front rod 60 like that of Fig. 5, I now employ the rod 130, which preferably has a positioning shoulder at 131 cooperating with the surface 109 of the lug 105 (Fig. 9) and a reduced portion 132 fitting in the bore 106 of the lug 105 and adapted to be secured therein by the set screw 87. The rod 130 has an upwardly extending screw-threaded portion 70, a washer 68 cooperating with the tines of the hairpin-shaped bar 62 and a wing nut 69 for clamping the washer against the said bar 62 to secure the same against the upper flat end of the rod 130. It is merely a matter of choice as to which form is preferred, inasmuch as questions of ease of manufacture and expense will ordinarily determine whether the Fig. 9 form or the Fig. 10 form is used.

Figure 12:
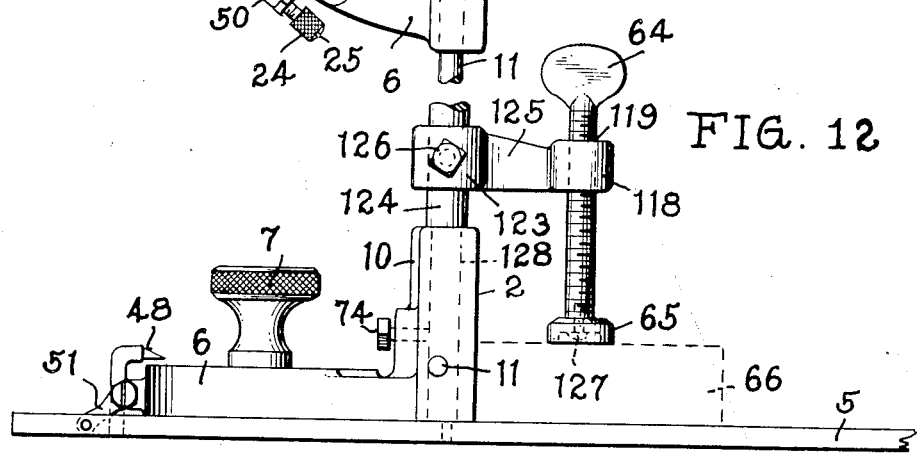

Fig. 11 is a plan view and Fig. 12 is a side elevation of a further modification, said figures being respectively similar to Figs. 1 and 2, but differing from said Figs. 1 and 2 in the nature of the work-clamping device employed. In these figures the bar 5 and gauge body 6, having the working face 2, the slot 13, and clamping screw 7, are similar to the corresponding elements in Figs. 1 and 2, as are the various other details with the exception of the work-clamping structure itself. In this form I provide a rod 124 which may have a reduced portion 128 secured in a corresponding bore in the lug 10 by means of a set screw 74, and is in this respect similar to the rod 60 of the Fig. 2 form. However, the rod 124 is not provided with screw threads at its upper end as is the rod 60, but instead I provide a clamping bar consisting of an arm 125 having at one end a lug 123 bored as shown at 117 to receive the rod 124, and at the other end a lug 118 provided with a screw threaded bore 119 to receive the threads of the thumb screw 64 which has the swivel head 65. The lug 123 is provided with a tapped bore 116, into which is screwed a set screw 126 which may be tightened to secure the lug 123 to the rod 124 at any desired position. The arm 125 will thus serve to hold the thumb screw 64 at a desired distance from the surface 2, said distance being suitable for clamping a workpiece 66 between the swivel head 65 and the bar 5, as shown clearly in Fig. 12.

Figure 13:
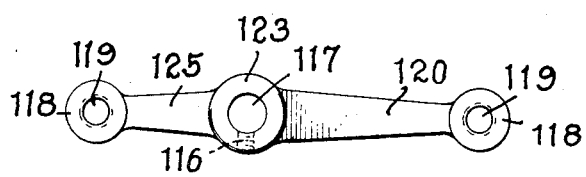
Fig. 13 is an illustration of a clamping bar which may be substituted for the clamping bar of Figs. 11 and 12.

In order to accommodate workpieces of different widths, I may provide a modified type of clamp such as is shown in Fig. 13. Here again the structure is a bar having a lug 123 thereon, bored at 117 to pass over the rod 124 and provided with a tapped bore 116 to receive a set screw, such as the set screw 126 of Fig. 12. In this case, however, I provide two arms on the clamp bar, one of them being the arm 125, similar to the arm 125 of Fig. 11, and having at its end a lug 118 bored and tapped at 119 to receive the threaded part of the thumb screw 64. At the other side of the lug 123 I provide another arm 120 which is of greater length than the arm 125, and at the end of said arm I likewise provide a lug 118 bored and tapped at 119 to receive the said screw. In order to make it possible to remove the thumb screw 64 entirely from the threaded bore 119, I may provide a screw 127 threaded into the lower end of the thumb screw 64 so that by removing said screw 127 the swivel head 65 may be removed from the screw 64 thus permitting said screw to be entirely withdrawn from any lug 118 and placed in another of said lugs.

Figure 14:
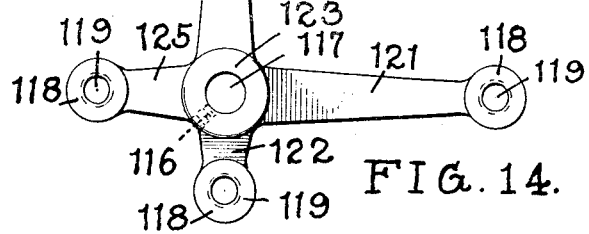
Fig. 14 is a detailed illustration of a still further modified form of clamping bar which may likewise be substituted for the clamping bar employed in Figs. 11 and 12.

I carry this modification still further in the form shown in Fig. 14, where I provide a four-armed or cross-shaped clamping member having a central lug 123 bored at 117 as in the other forms to receive the rod 124 and having four arms extending radially therefrom at right angles to one another, as shown at 120, 121, 122 and 125. Each of said arms has at its end a lug 118 bored and threaded at 119 as before. As shown, each of the arms, 120, 121, 122 and 125 is of a length different from the others, so that the proper one may be selected to cooperate with any desired workpiece. This clamping means is also provided with the threaded bore 116 adapted to receive a set screw such as 126 and be secured to the rod 124 by means thereof.

The operation of the various types of clamping means disclosed in the present case will be more or less obvious, but it may be desirable to describe the same briefly.

Referring first to the form illustrated in Figs. 1 to 5 inclusive, as already stated, after a workpiece 66 is placed against the bar 5 and the gauging surface 2, the stud or post 61 is screwed into a selected one of the threaded openings 71, preferably so chosen that the rod 61 is as close as possible to the rear edge of the workpiece. By thus selecting the position of the rod 61, the flexure of the bar 5 as well as of the other parts of the gauge will be minimized and the workpiece will, therefore, be held most securely and with a minimum of springing. With the workpiece thus secured against the gauge, it will be possible to do accurate work upon feeding the workpiece to the tool, for example a circular saw, particularly when the gauge setting is other than the 90° position illustrated in Fig. 1, because the tool or saw has a tendency to throw the workpiece to one side in certain cases or to draw it forward in other cases, in either event destroying the accuracy of the cut. This is particularly important when closely fitting joints are to be made or when it is important to have a definite angle of cut at the end of a workpiece for any reason. The thumb screw 64 may, of course, be adjusted to any desired position where it will be deemed to be most effective in securing the workpiece 66 by merely sliding the block 63 in the hairpin-shaped guide bar 62.

In the modified form shown in Figs. 6, 7 and 8 the operation is substantially the same as that in the form just described, with the exception that instead of securing bar 62 to the front post 60 by means of a wing nut 69, here the keyhole slots are relied upon to hold the clamping bar 81 in position. The collar 80, which is provided with the groove 79 preferably flattened on one side or on both sides as indicated at 79a to prevent it from turning in the straight portion 83 of the keyhole slot, will then serve as means for guiding the thumb screw 64 while it is being clamped against the workpiece. In this form the rods 78 will, of course, also be adjusted so as to embrace the workpiece as closely as possible and the thumb screw 64 may likewise be placed in that one of the keyhole slots which is the most advantageously positioned.

In the Fig. 9 form the operation is in general similar to that of the form of Figs. 6, 7 and 8, just described. However, in this form the front rod 85 is preferably secured in the lug 105 as mentioned, instead of employing a duplicate rod 78 inserted at the extreme front end of the bar 5. One advantage of this form is that thereby the nut 100 and body 6 are free from any obstruction above and may be readily manipulated regardless of whether the work-holding clamp is in position or not. As already stated the channel bar 81 may be engaged with its keyhole slots 82 in engagement with either the upper grooves 79 or the lower grooves 86 of the two rods 78 and 85 respectively, the upper position being specifically illustrated in Fig. 9. In certain cases it may be advantageous to use the lower grooves 86 in place of the upper grooves 79, for example, where a single workpiece which is to be operated on by the machine must be successively gripped at two points having different vertical dimensions during a single cycle of operations on the said member, thereby avoiding excessive manipulation of the screw 93. While this screw 93, as shown, has a knurled head 94, it is obvious that if preferred it may have any other suitable head, for instance, the ordinary thumb screw head such as shown in Fig. 5. If the bar 5 should be found to be either too tight or too loose on its pivot, it may be readily adjusted by inserting a screw driver in the slot 114 of the screw 90, after loosening the screw 88, of course, and then by turning the screw 90 up or down until the adjustment is as desired, said screw 90 may be again held in its adjusted position by tightening the screw 88. The clamping nut 100 cooperating with the stud 98 which passes through the arcuate slot of the body member 6 is, of course, equivalent in function to the screw 8, shown in Figs. 1, 2, 5, 11 and 12, but may be preferred in certain cases to the latter.

As stated, this form of gauge has certain advantages over the construction, shown for example in Fig. 5, in that adjustment is provided for in the pivot of the bar 5 whereas such adjustment is not available in the Fig. 5 form, and furthermore in the Fig. 9 form it will be noted that the bar 5 is securely held to the body member 6 by several independent means, namely, the screw threads 97, the set screw 88 and the clamping nut 100, which may be an advantage in securing additional clamping power and rigidity. It should be particularly noted that in the Fig. 9 form, because of the support afforded to the bar 5 by the conical head 111 of the screw 90, a much shorter unsupported span of the bar 5 is present than in the Fig. 5 form, where said bar is supported only at the screw 8 and at the rod 61, which is a further feature of advantage when flexure of the bar 5 is to be prevented to the greatest possible extent.

It will be obvious that in operation the Fig. 10 form will be substantially the same as the Fig. 9 form, inasmuch as these two forms differ from one another in much the same way that the form of Fig. 1 differs from that of Fig. 6, namely, in substituting a hairpin bar for a channel bar, and therefore it is not believed necessary to go into any detailed description of the operation of the Fig. 10 form.

The form illustrated in Figs. 11 and 12 is perhaps the simplest of all, and is very rigid, but will be found most useful for relatively narrow work. The operation of this form is self-evident. The clamping bar 125 is secured at a suitable elevation upon the rod 124 by means of the set screw 126, and the work 66 may then be clamped between the bar 5 and the swivel head 65 of the thumb screw 64.

The disadvantage of this type is that it may spring the bar 5 downward to a certain extent, but this flexure will not be a serious drawback in most cases.

In order to accommodate workpieces of different widths, the form of Fig. 13 may be employed by inserting the thumb screw 64 in one or other of the threaded apertures 119, and, of course, the bar will be swung with the appropriate arm over the work in accordance with the width of the work, namely the arm 125 for relatively narrow pieces and the arm 120 for wider ones.

The operation of the Fig. 14 form will, of course, also be obvious from the description of the Fig. 13 form, because here I merely increase the number of arms to four, making a convenient cross-shaped clamping device, the four arms of the cross being of four different lengths to cooperate with corresponding sizes of work.

Having thus described several embodiments of my invention and explained some of the advantages thereof.

I claim:

1. A work-holding clamp adapted to cooperate with a miter gauge, said miter gauge comprising a body member and a bar pivoted thereto, the clamp comprising means secured to said body member substantially in line with the pivot of the bar and having a member adapted to clamp a workpiece against said bar.

2. A work-holding clamp adapted to cooperate with a miter gauge, said miter gauge comprising a body member and a bar pivoted thereto, the clamp comprising rigid means secured to said body member substantially in line with the pivot of the bar and having a member cooperating with said rigid means, adapted to clamp a workpiece against said bar.

3. A work-holding clamp adapted to cooperate with a miter gauge, said miter gauge comprising a body member and a bar pivoted thereto, the clamp comprising means secured to said bar and means secured to said body member substantially in line with the pivot of the bar, a rigid member secured to both said means and a member carried by said rigid member and adapted to clamp a workpiece against said bar.

4. A work-holding clamp adapted to cooperate with a miter gauge, said miter gauge comprising a body member and a bar pivoted thereto, the clamp comprising a rod secured to said bar and a rod secured to said body member substantially in line with the pivot of the bar, a rigid member secured to both said rods and a member carried by said rigid member and adapted to clamp a workpiece against said bar.

5. A work-holding clamp adapted to cooperate with a miter gauge, said miter gauge comprising a body member and a bar pivoted thereto, the clamp comprising a rod having a groove and secured to said bar and a rod having a groove and secured to said body member, a rigid member which is slotted so that it may be engaged in the grooves and thus be secured to both said rods and a screw-threaded member carried by said rigid member and adapted to clamp a workpiece against said bar.

6. Work-holding means for cooperation with a miter gauge, said miter gauge comprising a body member and a bar pivoted thereto, the work-holding means comprising rods, one of said rods being substantially in line with the pivot of the bar, means for securing one end of each rod to the bar, a rigid element secured to the other ends of the rods, and a work engaging member supported by said rigid element.

7. Work-holding means adapted to co-operate with a slidable gauge of the type comprising two members, namely a body and a slide bar, pivotally movable with respect to one another, said means comprising a rigid bar, means for securing it to the members of the gauge and spaced from the slide bar, one of the securing means being substantially in line and with the pivot, and means supported by said rigid bar for securing a workpiece to said slide bar.

8. Work-holding means for cooperation with a miter gauge, the work-holding means comprising a rod, means for securing said rod to the gauge, a rigid member slidably adjustable on said rod, means for securing said rigid member to the rod and a work-clamping means supported by said rigid member.

9. Work-holding means for cooperation with a miter gauge, the work-holding means comprsing a rod, means for securing said rod to the gauge, a rigid member having at least one arm and adjustable along the rod, means for securing said rigid member to the rod and work-clamping means supported by an arm of said rigid member.

10. Work-holding means for cooperation with a miter gauge, the work-holding means comprising a rod, means for securing said rod to the gauge, a rigid member having a plurality of arms of different lengths, means for securing said rigid member to the rod and work-clamping means supported by a selected arm of said rigid member.

11. Work-holding means for cooperation with a miter gauge, said miter gauge comprising a body member and a bar pivoted thereto, the work-holding means comprising rods, the bar having a number of threaded apertures therein, each rod being threaded at one end to fit said apertures, for thus securing one end of each rod to the bar, a rigid element secured to the other ends of the rods, and a screw supported by said rigid element.

12. Work-holding means for cooperation with a miter gauge, said miter gauge comprising a body member and a bar pivoted thereto, the work-holding means comprising rods, the bar having a number of threaded apertures therein, each rod being threaded at one end to fit said apertures, for thus securing one end of each rod to the bar, a bifurcated rigid element secured to the other ends of the rods, a block slidable upon said bifurcated element and a screw supported by said block.

13. Work-holding means for cooperation with a miter gauge, the said miter gauge comprising a body member and a bar pivoted thereto, the said bar having a number of threaded apertures therein, the work-holding means comprising rods, each rod being threaded at one end to fit the said apertures, for thus securing one end of each rod to the bar, a bifurcated rigid element, releasable means whereby the said element may be secured to the other ends of the rods, a block slidable upon the said bifurcated element and a screw supported by the said block.

14. Work-holding means for cooperation with a miter gauge, the said miter gauge comprising a body member and a bar pivoted thereto, the said bar having a number of threaded apertures therein, the work-holding means comprising rods, each rod being threaded at one end to fit the said apertures, for thus securing one end of each rod to the bar, a channel member, means for securing the other end of each rod to the channel member opposite a corresponding point on the bar, and a screw cooperating with said member to hold a workpiece against the bar.

15. Work-holding means for cooperation with a miter gauge, the said miter gauge comprising a body member and a bar pivoted thereto, the said bar having a number of threaded apertures therein, the work-holding means comprising rods, each rod being threaded at one end to fit the said apertures, for thus securing one end of each rod to the bar, each rod being grooved near its other end, a channel member, the said channel member having a number of spaced key-hole slots in its web, each rod having its groove engaged in a corresponding one of said slots, for securing the other end of each rod to the channel member, and a screw cooperating with said member to hold a workpiece against the bar.

16. Work-holding means for cooperation with a miter gauge, the said miter gauge comprising a body member and a bar pivoted thereto, the said bar having a number of threaded apertures therein, the work-holding means comprising rods, each rod being threaded at one end to fit the said apertures, for thus securing one end of each rod to the bar, each rod being grooved near its other end, a channel member, the said channel member having a number of spaced key-hole slots in its web, each rod having its groove engaged in a corresponding one of said slots, for securing the other end of each rod to the channel member, a threaded collar having a groove therein to fit any one of said slots, and a screw threaded through said collar and cooperating with said bar to hold a workpiece.

17. A miter gauge having a clamping means for a workpiece, said miter gauge consisting of a body member providing a gauging face, a bar, a screw threaded into the body member and having a tapered head, the bar having a correspondingly tapered opening to receive the head of said screw, whereby the said screw head acts as a pivot for the bar with reference to said gauging face, and whereby said screw prevents deformation of the bar when clamping force is applied against said bar, and is adjustable for wear, a support secured to the body member, a rigid element carried by said support, and a clamping device supported by said rigid element and adapted to clamp a workpiece against the bar of the gauge.

18. A miter gauge having a clamping means for a workpiece, said miter gauge consisting of a body member providing a gauging face, a bar, a screw threaded into the body member and having a tapered head, the bar having a correspondingly tapered opening to receive the head of said screw, whereby the said screw head acts as a pivot for the bar with reference to said gauging face, and whereby said screw prevents deformation of the bar when clamping force is applied against said bar, and is adjustable for wear a support secured to the body member, a support secured to the bar, a rigid element carried by said supports, and a clamping device supported by said rigid element and adapted to clamp a workpiece against the bar of the gauge.

19. A work-holding clamp adapted to cooperate with a miter gauge, said miter gauge comprising a body member and a bar pivoted thereto, the clamp comprising a rod having a groove and secured to said bar and a rod having a groove and secured to said body member, a rigid member which is slotted so that it may be engaged in the grooves and thus be secured to both said rods and an adjustable member carried by said rigid member and adapted to clamp a workpiece against said bar.

20. Work-holding means for cooperation with a miter gauge, said miter gauge comprising a body member and a bar pivoted thereto, the work-holding means comprising rods, the bar having a number of apertures therein, each rod being shaped at one end to fit said apertures and thereby secure said end of each rod to the bar, a rigid element secured to the other ends of the rods, and work-engaging means supported by said rigid element.

21. Work-holding means for cooperation with a miter gauge, said miter gauge comprising a body member and a bar pivoted thereto, the work-holding means comprising rods, the bar having a number of apertures therein, each rod being shaped at one end to fit said apertures, for thus securing one end of each rod to the bar, a bifurcated rigid element secured to the other ends of the rods, a block slidable upon said bifurcated element and work-engaging means supported by said block.

22. Work-holding means for cooperation with a miter gauge, the said miter gauge comprising a body member and a bar pivoted thereto, the work-holding means comprising rods, each rod being provided at one end with means for securing it to the bar, a bifurcated rigid element, releasable means whereby the said element may be secured to the other ends of the rods, a block slidable upon the said bifurcated element and work-engaging means supported by the said block.

23. Work-holding means for cooperation with a miter gauge, the said miter gauge comprising a body member and a bar pivoted thereto, the work-holding means comprising rods, means for securing one end of each rod to the bar, a channel member, means for securing the other end of each rod to the channel member, and means cooperating with said member to hold a workpiece against the bar.

24. Work-holding means for cooperation with a miter gauge, the said miter gauge comprising a body member and a bar pivoted thereto, the work-holding means comprising rods, means for securing one end of each rod to the bar, each rod being grooved near its other end, a channel member, the said channel member having a number of spaced keyhole slots in its web, each rod having its groove engaged in a corresponding one of said slots, for securing the other end of each rod to the channel member, and means cooperating with said member to hold a workpiece against the bar.

25. Work-holding means for cooperation with a miter gauge, the said miter gauge comprising a body member and a bar pivoted thereto, the work-holding means comprising rods, means for securing one end of each rod to the bar, each rod being grooved near its other end, a channel member, the said channel member having a number of spaced keyhole slots in its web, each rod having its groove engaged in a corresponding one of said slots, for securing the other end of each rod to the channel member, a collar having a groove therein to fit any one of said slots, and work-engaging means supported by said collar and cooperating with said bar to hold a workpiece.

In testimony that I claim the foregoing as my invention, I have signed my name thereto.

HERBERT E. TAUTZ.

CERTIFICATE OF CORRECTION.

Patent No. 1,894,010.                                              January 10, 1933.

HERBERT E. TAUTZ.

It is hereby certified that error appears in the printed specification of the above numbered patent requiring correction as follows: Page 4, line 16, for "cases" read "case"; page 7, line 17, claim 7, strike out the word "and"; and that the said Letters Patent should be read with these corrections therein that the same may conform to the record of the case in the Patent Office.

Signed and sealed this 7th day of February, A. D. 1933.

M. J. Moore,
Acting Commissioner of Patents.

(Seal)